UNITED STATES PATENT OFFICE.

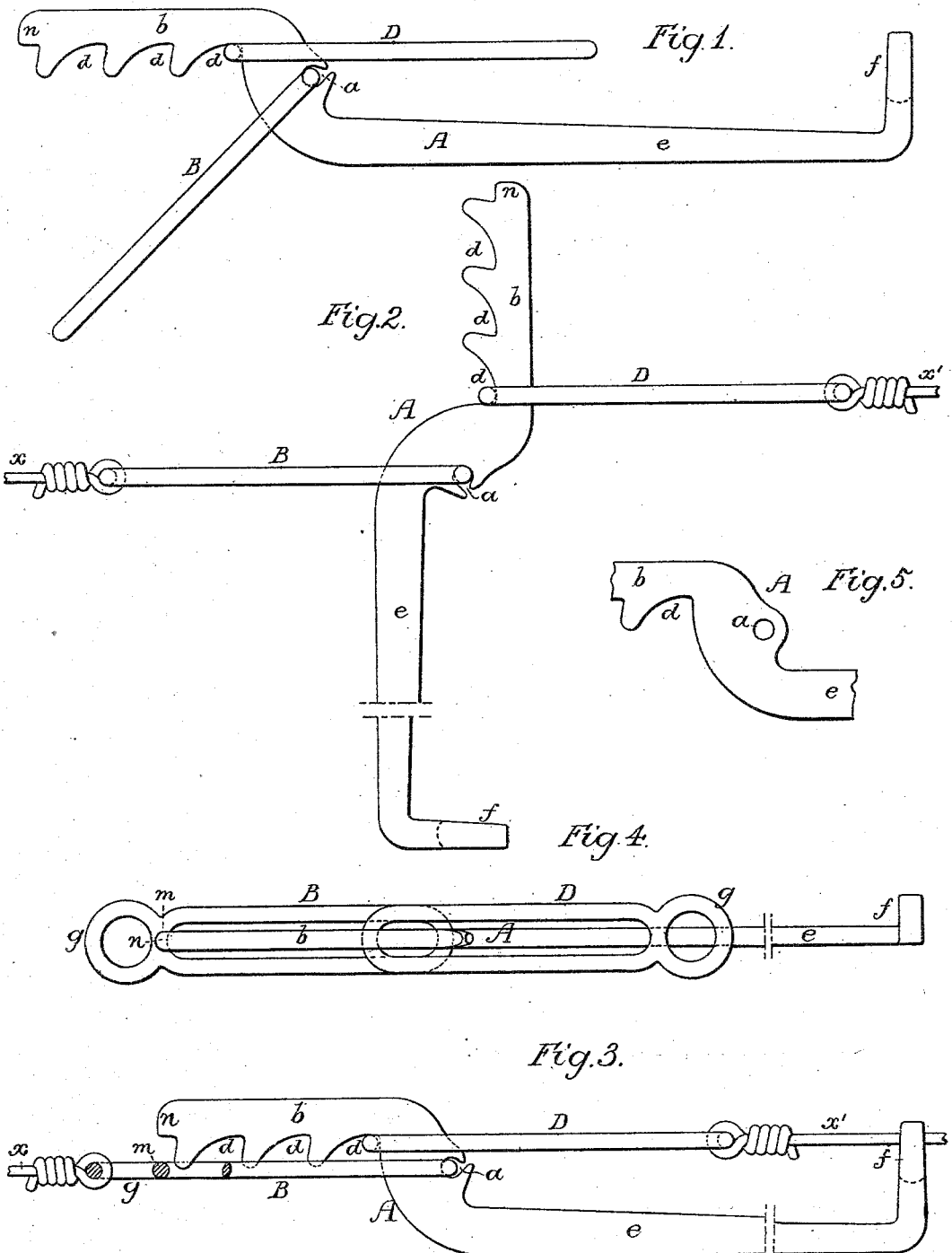

HILLBORN DARLINGTON, OF CONCORD, DELAWARE COUNTY, PA.

DEVICE FOR CONNECTING AND STRETCHING FENCE-WIRES.

SPECIFICATION forming part of Letters Patent No. 295,114, dated March 11, 1884.

Application filed December 14, 1883. (No model.)

*To all whom it may concern:*

Be it known that I, HILLBORN DARLINGTON, a citizen of the United States, and a resident of Concord, Delaware county, Pennsylvania, have invented certain Improved Devices for Tightening or Slackening Stretched Cords or Wires, of which the following is a a specification.

My invention consists of certain improvements in the device for which I obtained Letters Patent of the United States No. 154,024, dated August 11, 1874, although the present device is not limited in its application to fence-wires, but can be applied to hammock-ropes, or suspension-cords, or wires generally.

The main object of the improvements is to construct the device in such a manner that it can be readily applied to or detached from the opposite ends of the wire or cord.

In the accompanying drawings, Figure 1 is a side view of the device with the improvements; Fig. 2, a view showing the device attached to the ends of two wires which are to be drawn together; Fig. 3, the same, showing the wires drawn tight; Fig. 4, a plan view of the device, and Fig. 5 a view showing a modified construction of part of the same.

In the patented device above alluded to a lever, A, substantially similar to that shown in the drawings, was employed, said lever having the pivot-opening $a$, short arm $b$, with notches $d$, and long arm $e$, with hooked end $f$. The present device differs from the patented one, however, in that the lever A is furnished with two links, B and D, the former being adapted at one end to the pivot-opening $a$ of the lever, while the link D is adapted to one of the notches $d$ of the short arm $b$. The outer end of each link is furnished with an eye, $g$—that of the link B for attachment to one wire $x$, and that of the link D for attachment to an opposite wire, $x'$—the duty of the lever and links being to draw the ends of the two wires together, and thus stretch the wires. The use of the links B and D provides a ready means of connecting the wires $x x'$ to the lever A without the looped wires required by the patented device, thus simplifying the application of the lever; but the main advantage of the improved device is that it permits the ready release of the wires from the control of the lever when it is desired to disconnect the same or shift the connection to another notch $d$. In the patented device looped wires form the connection between the wires $x x'$ and the lever. When said looped wires are of a flexible character—such, for instance, as the cable-wires used for barbed fencing—the loops will slip and bind upon the lever, so as to prevent the detaching of the same. By the use of the links B D, I overcome this objection, and am also enabled to use the device in connection with hammock-ropes or other flexible supporting devices.

A bar with an eye at each end may be substituted for the link, if desired.

The bar $m$ at the outer end of the link B serves, by contact with the projecting end $n$ of the short arm $b$ of the lever, to prevent said link B from swinging over to the wrong side of the lever, where it might tend to cause confusion and detract from the readiness with which the device could be applied.

The opening $a$, for the reception of the link B, may be formed in the edge of the lever, as shown in Figs. 1, 2, and 3; or the link may be adapted to an opening in the lever—such as shown in Fig. 5—if desired.

I claim as my invention—

1. The combination of cords or wires $x x'$ with a tightening device comprising a lever, A, the short arm of which has notches $d$, with two links, B and D, one connected to one wire and having the lever pivoted to it, and the other connected to the opposite wire and adapted to engage with the notched arm of the lever, as set forth.

2. The combination of the lever A with the link B, hung thereto, and having a bar, $m$, adapted by contact with the short arm of the lever to limit the movement of said link, as set forth.

In testimony whereof I have signed my name to this specification in the presence of two subscribing witnesses.

HILLBORN DARLINGTON.

Witnesses:
  WM. G. RUPERT,
  A. RUPERT.